US007516174B1

(12) United States Patent
Tashjian et al.

(10) Patent No.: US 7,516,174 B1
(45) Date of Patent: Apr. 7, 2009

(54) WIRELESS NETWORK SECURITY MECHANISM INCLUDING REVERSE NETWORK ADDRESS TRANSLATION

(75) Inventors: Robert W. Tashjian, Fremont, CA (US); Sumit Vakil, Milpitas, CA (US); Jing Wang, Sunnyvale, CA (US)

(73) Assignee: Cisco Systems, Inc., San Jose, CA (US)

( * ) Notice: Subject to any disclaimer, the term of this patent is extended or adjusted under 35 U.S.C. 154(b) by 738 days.

(21) Appl. No.: 10/979,409

(22) Filed: Nov. 2, 2004

(51) Int. Cl.
*G06F 15/16* (2006.01)
(52) U.S. Cl. ............... 709/200; 709/203; 709/219; 709/245; 455/403; 455/411; 726/15
(58) Field of Classification Search ............... 709/229, 709/249, 203, 219, 224, 245; 455/403, 410, 455/411, 424; 726/15
See application file for complete search history.

(56) References Cited

U.S. PATENT DOCUMENTS

| 5,335,246 | A | 8/1994 | Yokev et al. |
| 5,491,692 | A | 2/1996 | Gunner et al. |
| 5,564,079 | A | 10/1996 | Olsson |
| 5,621,727 | A | 4/1997 | Vaudreuil |
| 5,684,860 | A | 11/1997 | Milani et al. |
| 5,749,044 | A | 5/1998 | Natarajan et al. |
| 5,809,059 | A | 9/1998 | Souissi et al. |
| 5,920,699 | A | 7/1999 | Bare |
| 6,112,095 | A | 8/2000 | Wax et al. |
| 6,115,605 | A | 9/2000 | Siccardo et al. |
| 6,134,448 | A | 10/2000 | Shoji et al. |

(Continued)

FOREIGN PATENT DOCUMENTS

EP    0 930 514 A2    7/1999

(Continued)

OTHER PUBLICATIONS

Chirumamilla, Mohan K. and Ramamurthy, Byrav. "Agent Based Intrusion Detection and Response System for Wireless LANs." IEEE Int'l Conference on Communications, 2003, vol. 1, pp. 492-496.

(Continued)

*Primary Examiner*—Moustafa M Meky
*Assistant Examiner*—El Hadji M Sall
(74) *Attorney, Agent, or Firm*—Baker Botts L.L.P.

(57) ABSTRACT

Methods, apparatuses and systems directed to preventing unauthorized access to internal network addresses transmitted across wireless networks. According to the invention, mobile stations are assigned virtual client network addresses that are used as the outer network addresses in a Virtual Private Network (VPN) infrastructure, as well as unique internal network addresses used as the inner network addresses. In one implementation, the virtual client network addresses have little to no relation to the internal network addressing scheme implemented on the network domain. In one implementation, all clients or mobile stations are assigned the same virtual client network address. A translation layer, in one implementation, intermediates the VPN session between the mobile stations and a VPN server to translate the virtual client network addresses to the internal network addresses based on the medium access control (MAC) address corresponding to the mobile stations. In this manner, the encryption inherent in the VPN infrastructure prevents access to the internal network addresses assigned to the mobile stations.

9 Claims, 6 Drawing Sheets

U.S. PATENT DOCUMENTS

| | | | |
|---|---|---|---|
| 6,140,964 A | 10/2000 | Sugiura et al. | |
| 6,175,379 B1 | 1/2001 | Ishii et al. | |
| 6,198,935 B1 | 3/2001 | Saha et al. | |
| 6,208,629 B1 | 3/2001 | Jaszewski et al. | |
| 6,212,391 B1 | 4/2001 | Saleh et al. | |
| 6,249,252 B1 | 6/2001 | Dupray | |
| 6,259,406 B1 | 7/2001 | Sugiura et al. | |
| 6,269,246 B1 | 7/2001 | Rao et al. | |
| 6,275,190 B1 | 8/2001 | Sugiura et al. | |
| 6,282,427 B1 | 8/2001 | Larsson et al. | |
| 6,286,038 B1 | 9/2001 | Reichmeyer et al. | |
| 6,304,218 B1 | 10/2001 | Sugiura et al. | |
| 6,304,912 B1 | 10/2001 | Oguchi et al. | |
| 6,414,634 B1 | 7/2002 | Tekinay | |
| 6,415,155 B1 | 7/2002 | Koshima et al. | |
| 6,441,777 B1 | 8/2002 | McDonald | |
| 6,456,892 B1 | 9/2002 | Dara-Abrams et al. | |
| 6,526,283 B1 | 2/2003 | Jang | |
| 6,556,942 B1 | 4/2003 | Smith | |
| 6,643,278 B1 | 11/2003 | Panasik et al. | |
| 6,754,220 B1 | 6/2004 | Lamberton et al. | |
| 6,760,318 B1 | 7/2004 | Bims | |
| 6,772,226 B1 | 8/2004 | Bommareddy et al. | |
| 6,788,658 B1 | 9/2004 | Bims | |
| 6,823,462 B1 | 11/2004 | Cheng et al. | |
| 6,917,819 B2 | 7/2005 | Collins | |
| 6,925,070 B2 | 8/2005 | Proctor, Jr. | |
| 6,934,292 B1 | 8/2005 | Ammitzoboell | |
| 6,944,785 B2 | 9/2005 | Gadir et al. | |
| 6,957,067 B1 | 10/2005 | Iyer et al. | |
| 6,993,026 B1 | 1/2006 | Baum et al. | |
| 7,002,943 B2 | 2/2006 | Bhagwat et al. | |
| 7,016,948 B1 | 3/2006 | Yildiz | |
| 7,036,143 B1 | 4/2006 | Leung et al. | |
| 7,088,689 B2 | 8/2006 | Lee et al. | |
| 7,107,614 B1 | 9/2006 | Boden et al. | |
| 7,110,375 B2 | 9/2006 | Khalil et al. | |
| RE39,317 E | 10/2006 | Sakagawa | |
| 7,152,117 B1 * | 12/2006 | Stapp et al. | 709/245 |
| 7,154,889 B1 | 12/2006 | Rekhter et al. | |
| 7,164,663 B2 | 1/2007 | Frank et al. | |
| 7,212,837 B1 | 5/2007 | Calhoun et al. | |
| 2002/0174335 A1 | 11/2002 | Zhang et al. | |
| 2002/0188723 A1 | 12/2002 | Choi | |
| 2002/0194384 A1 | 12/2002 | Habetha | |
| 2003/0023746 A1 | 1/2003 | Loguinov | |
| 2003/0054794 A1 | 3/2003 | Zhang | |
| 2003/0117985 A1 | 6/2003 | Fujii et al. | |
| 2003/0134648 A1 | 7/2003 | Reed et al. | |
| 2003/0135762 A1 | 7/2003 | Macaulay | |
| 2003/0172149 A1 * | 9/2003 | Edsall et al. | 709/224 |
| 2003/0181215 A1 | 9/2003 | Cromer et al. | |
| 2003/0186679 A1 | 10/2003 | Challener et al. | |
| 2003/0188006 A1 | 10/2003 | Bard | |
| 2003/0198208 A1 | 10/2003 | Koos, Jr. et al. | |
| 2003/0219008 A1 | 11/2003 | Hrastar | |
| 2003/0224787 A1 | 12/2003 | Gandolfo | |
| 2004/0003285 A1 | 1/2004 | Whelan et al. | |
| 2004/0008652 A1 | 1/2004 | Tanzella et al. | |
| 2004/0023639 A1 | 2/2004 | Noel | |
| 2004/0023640 A1 | 2/2004 | Ballai | |
| 2004/0047324 A1 | 3/2004 | Diener | |
| 2004/0049699 A1 | 3/2004 | Griffith et al. | |
| 2004/0076134 A1 | 4/2004 | Barber et al. | |
| 2004/0111607 A1 | 6/2004 | Yellepeddy | |
| 2004/0121827 A1 | 6/2004 | Murakami et al. | |
| 2004/0176108 A1 | 9/2004 | Misikangas | |
| 2004/0185777 A1 * | 9/2004 | Bryson | 455/41.1 |
| 2004/0198392 A1 | 10/2004 | Harvey et al. | |
| 2005/0030929 A1 | 2/2005 | Swier et al. | |
| 2005/0073979 A1 | 4/2005 | Barber et al. | |
| 2005/0114649 A1 | 5/2005 | Challener et al. | |
| 2005/0207381 A1 | 9/2005 | Aljadeff et al. | |
| 2005/0210150 A1 * | 9/2005 | Bahl | 709/245 |

FOREIGN PATENT DOCUMENTS

| | | |
|---|---|---|
| EP | 0 967 816 A1 | 12/1999 |
| EP | 1 018 457 A1 | 7/2000 |
| EP | 1 296 531 A1 | 3/2003 |
| EP | 1 301 055 A1 | 4/2003 |
| JP | 02044929 | 2/1990 |
| WO | WO 98/41048 | 12/1999 |
| WO | WO 99/08909 | 7/2000 |
| WO | WO 97/33386 | 10/2000 |
| WO | WO 02/43425 A1 | 5/2002 |
| WO | WO 02/054813 A1 | 7/2002 |
| WO | WO 03/023443 A2 | 3/2003 |

OTHER PUBLICATIONS

"IBM Research Demonstrates Industry's First Auditing Tool For Wireless Network Security." Jul. 12, 2001, Hawthorne, N.Y. IBM Research News, 'Online. URL: http://domino.research.ibm.com/comm/pr.nsf/pages/news.20010712_wireless.html.

"IBM Researchers Demonstrate Industry's First Self-Diagnostic Wireless Security Monitoring Tool." Jun. 21, 2002, Hawthorne, N.Y. IBM NIEUWS, 'Online! URL:http://domino.research.ibm.com/comm/pr.nsf/pages/news.20020617_dwsa.html.

"Ekahau Logical Areas-location enabling the Wi-Fi network." Apr. 4, 2003. Ekahau, Inc., Saratoga, CA. Company's URL: www.ekahau.com.

"Ekahau Positioning Engine 2.0: Product Overview." Apr. 4, 2003. Ekahau, Inc., Saratoga, CA. URL: http://www.ekahau.com/products/positioningengine/.

"Ekahau Positioning Engine 2.0: Data Sheet." Apr. 4, 2003. Ekahau, Inc., Saratoga, CA. URL: http://www.ekahau/com/pdf/EPE_2.0_datasheet.PDF.

"Indoor Positioning in 802.11b Networks." Apr. 4, 2003. Ekahau, Inc., Saratoga, CA. URL: http://www.ekahau.com/products/positioningengine/features.html.

"InFielder." Apr. 22, 2003. Wireless Valley, Austin, TX. URL: http://www.wirelessvalley.com/Products/InFielder/InFielder.asp.

"LANFielder." Apr. 22, 2003. Wireless Valley, Austin, TX. URL: http://wirelessvalley.com/Products/LANFielder/LANFielder.asp.

"Optimatic." Apr. 22, 2003. Wireless Valley, Austin, TX. URL: http://www.wirelessvalley.com/Products/Optimatic/Optimatic.asp.

"Predictor." Apr. 22, 2003. Wireless Valley, Austin, TX. URL: http://www.wirelessvalley.com/Products/Predictor/Predictor.asp.

"LANFielder Product Literature." Feb. 10, 2004. Wireless Valley, Austin, TX. URL: http://www.wirelessvalley.com/Assets/brochures/LanFielder.pdf.

Conley, C.. "Securing WLANS with Location-Enabled Networks." Wireless Security Perspectives, vol. 5, No. 3 Mar. 2003. Organization's URL: www.cnp-wireless.com/wsp.html.

"Company Information." Apr. 6, 2004. Corsair Communications:A LightBridge Company, Burlington, MA. Company's URL: www.lightbridge.com.

"Corporate Fact Sheet." Aruba Wireless Networks, San Jose, CA. Feb. 10, 2004. URL: http://www.arubanetworks.com/pdf/corporate_fact_sheet.pdf.

"Airwave Rogue Access Point Detection." 2002. Airwave Wireless, Inc. San Mateo, CA. URL: http://airwave.com/features.html.

Geier, J. "Identifying Rogue Access Points." Jan. 6, 2003. Wi-Fi Planet Tutorials. URL: http://www.wi-fiplanet.com/tutorials/article.php/1564431.

Brewin, B. "IBM Develops Tool to Detect Rogue Wireless LAN Access Points." Jun. 17, 2002. Computerworld, Framingham, MA. URL: http://www.computerworld.com/mobiletopics/mobile/story/0,10801,72065,00.html.

Bulusu, N., Heidemann, J., Estrin, D. "GPS-less Low Cost Outdoor Localization for Very Small Devices." *IEEE Personal Communications*, Oct. 2000. URL: http://lecs.cs.ucla.edu/~bulusu/papers/Bulusu00a.pdf.

"Assessing Wireless Security with AiroPeek and AiroPeek NX." A WildPackets Academy Tutorial from www.wildpackets.com, WildPackets Inc., Walnut Creek, CA. Jan. 16, 2003. URL: http://www.wildpackets.com/elements/whitepapers.AiroPeek_Security.pdf.

"AiroPeek and Wireless Security: Identifying and Locating Rogue Access Points." A WildPackets Academy Tutorial from www.wildpackets.com, WildPackets Inc., Walnut Creek, CA. Jan. 16, 2003. URL: http://www.wildpackets.com/elements/whitepapers/RogueAccessPoints.pdf.

Craiger, J. P. "802.11, 802.1x, and Wireless Security." Jun. 23, 2002. From the SANS' Information Security Reading Room on www.sans.org, The SANS Institute, Bethesda, MD. URL: http://www.sans.org/rr/papers/68/171.pdf.

Baily, S. "Is IEEE 802.1X Ready for General Deployment?" Apr. 7, 2002. From the SANS' Information Security Reading Room on www.sans.org, The SANS Institute, Bethesda, MD. URL: http://www.sans.org/rr/papers/9/709.pdf.

International Standard, ISO/IEC 8802-11 ANSI/IEEE Std. 802.11, 1999 Edition, Part II: Wireless LAN Medium Access Control (MAC) and Physical Layer (PHY) specifications, pp. 122-137.

"tcp-masq" Internet citation http://speed.cis.nctu.edu.tw/bandwith/opensource/, Daa Sheet Cisco Aironet 1200 Series Access Point, pp. 1-13, posted Mar. 11, 2002

Brelaz, "New Methods to Color the Verticles of a Graph," *Communications of the ACM*, vol. 22, No. 4, pp. 251-256, Apr. 1979 (online).

Randall-Brown, "Chromatic Scheduling and the Chromatic Number Problem", *Management Science*, vol. 19, No. 4, pp. 456-463, Dec. 1972.

* cited by examiner

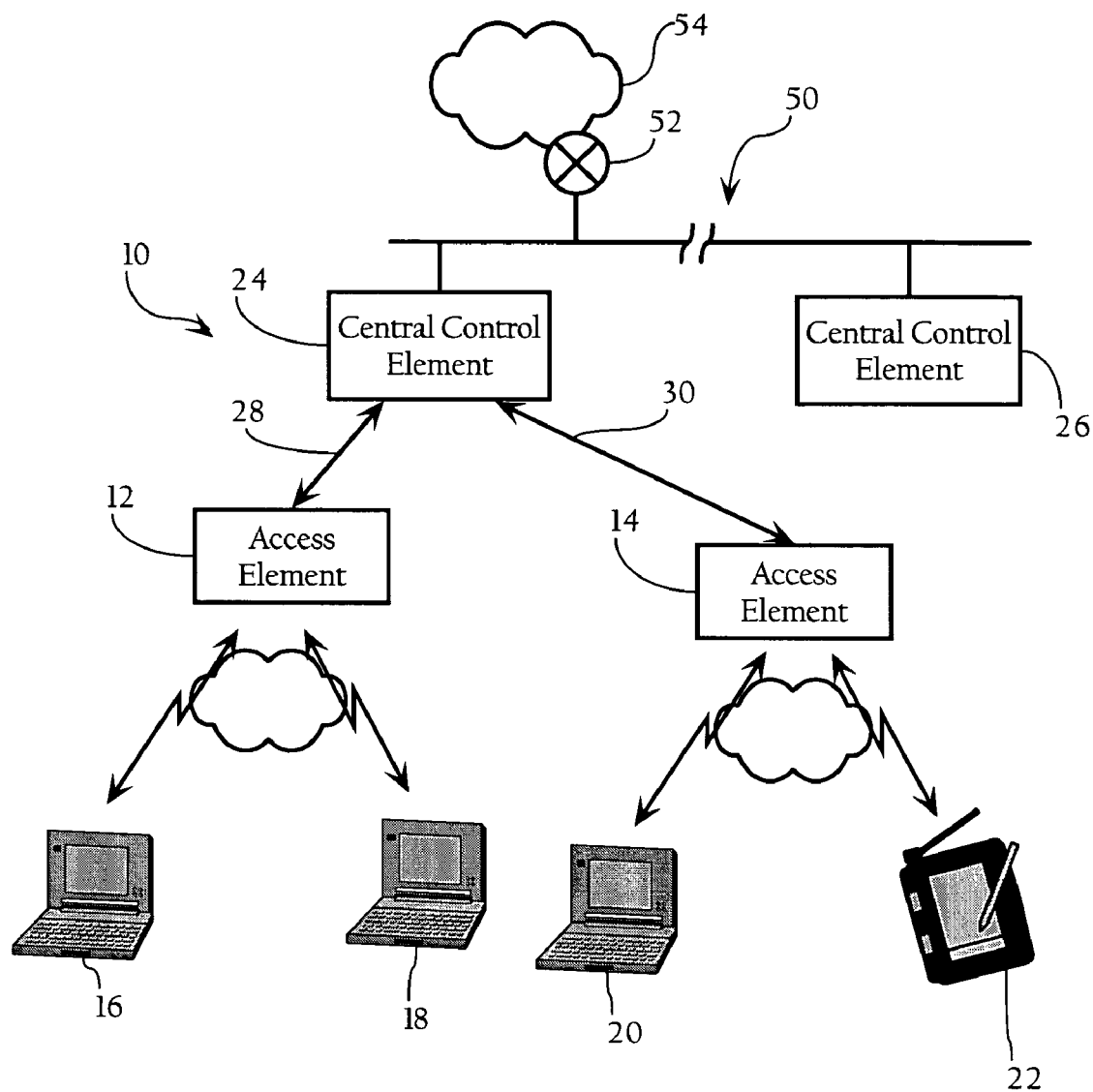
Fig._1

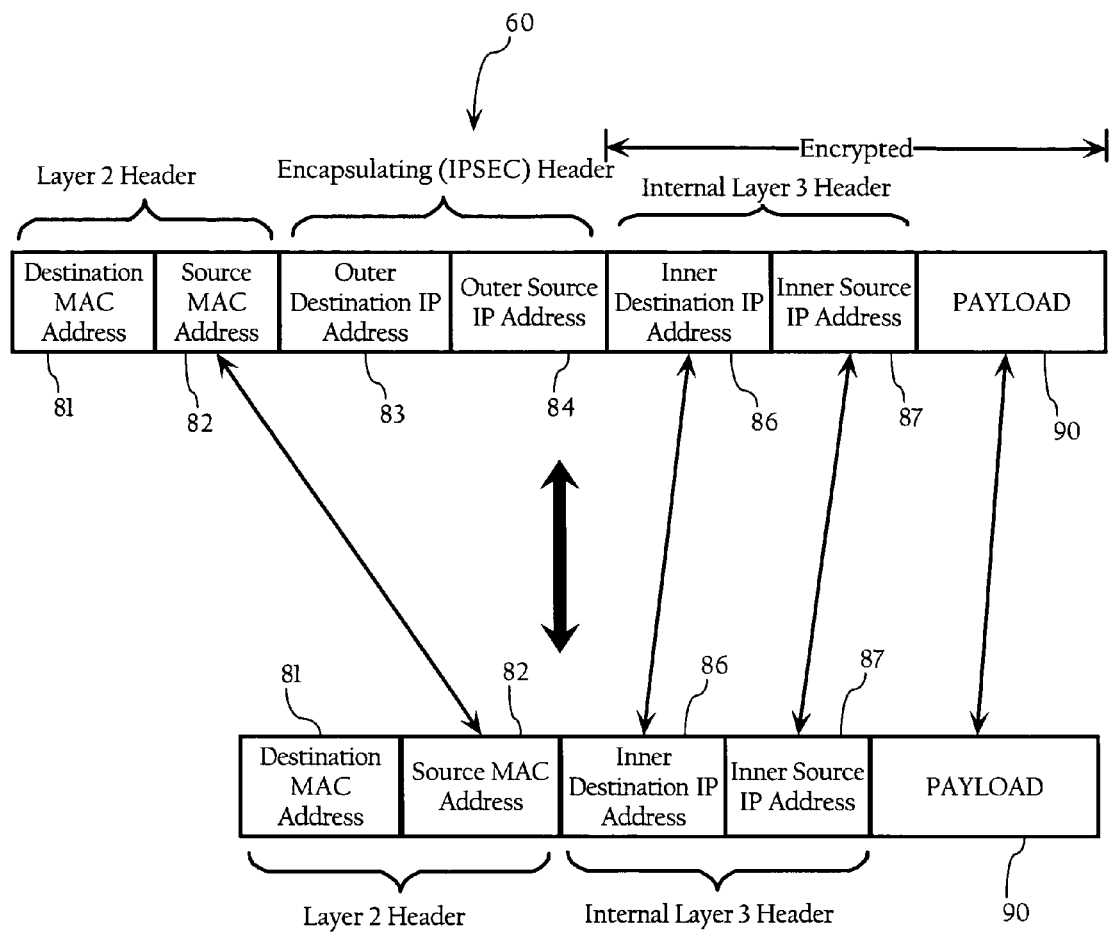
Fig._2

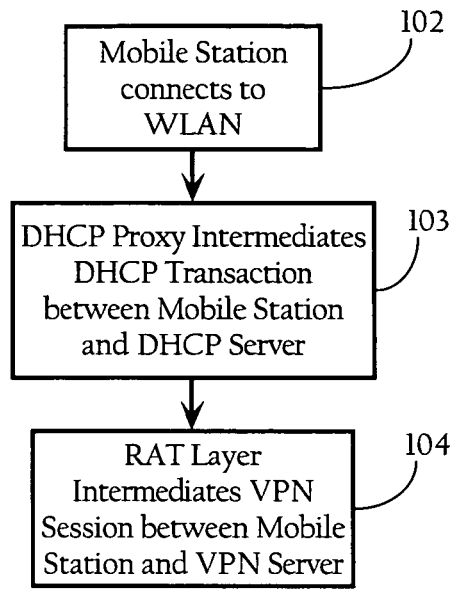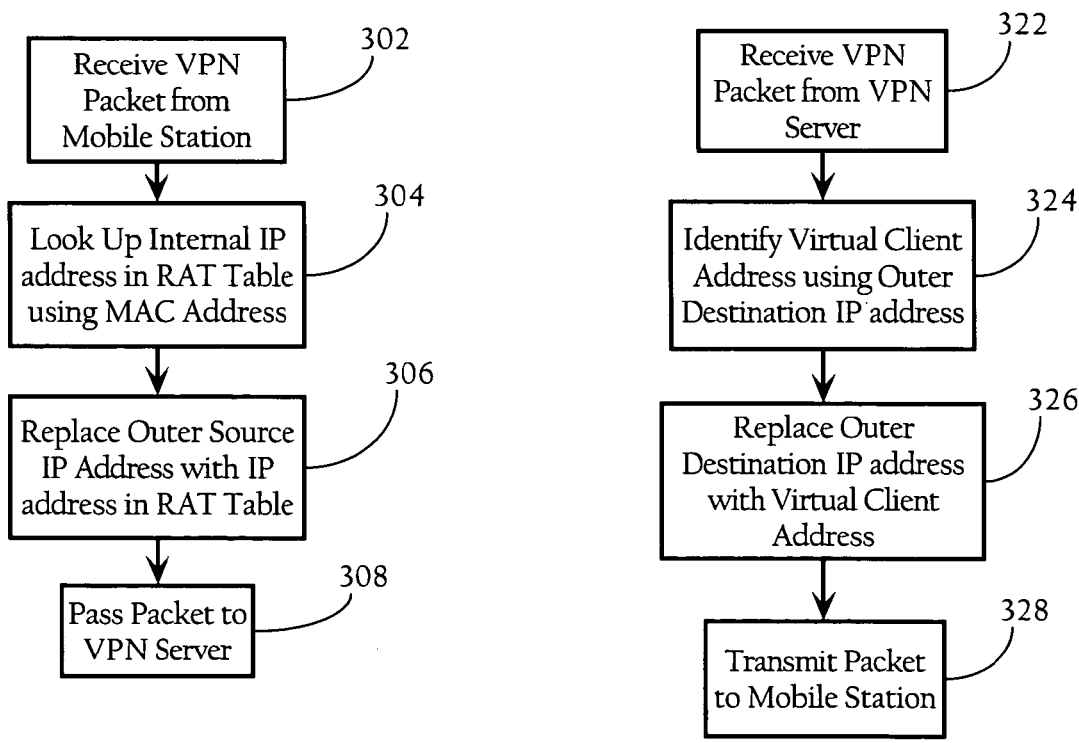

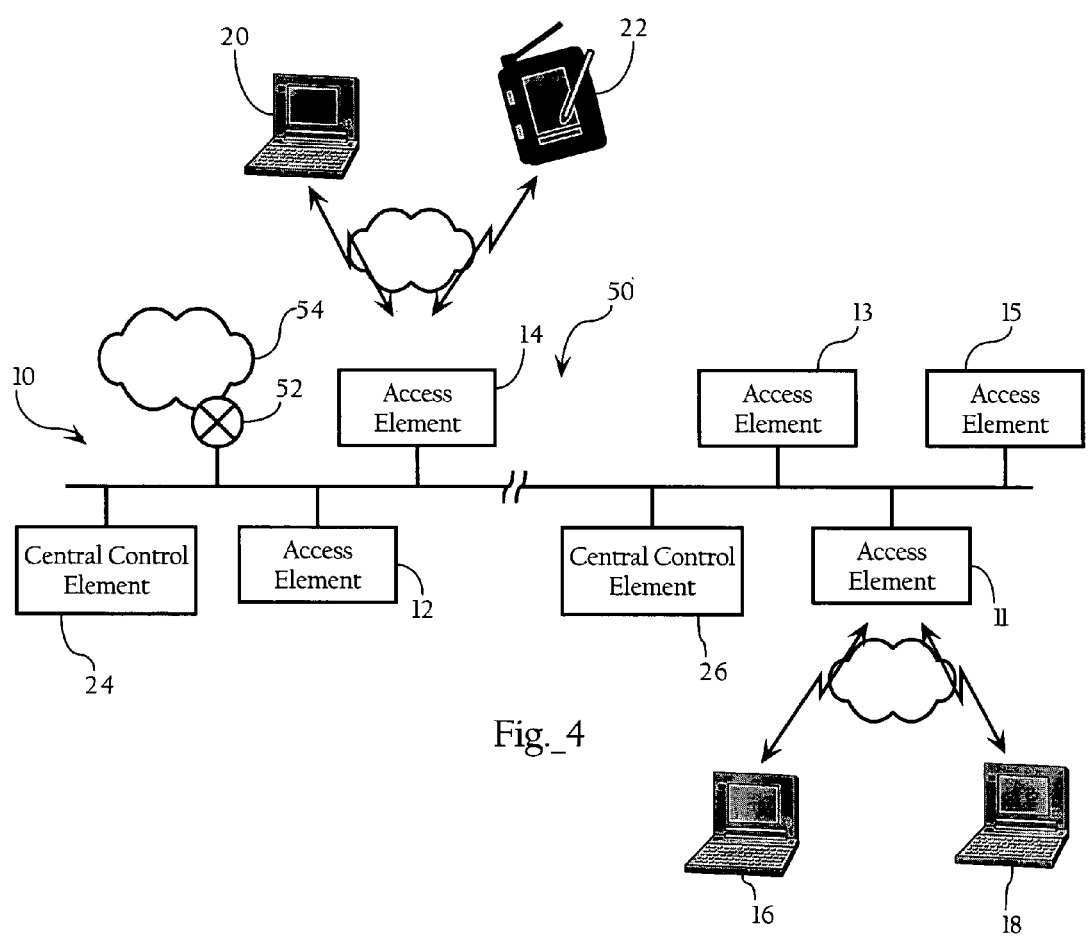
Fig._4

WIRELESS NETWORK SECURITY MECHANISM INCLUDING REVERSE NETWORK ADDRESS TRANSLATION

CROSS-REFERENCE TO RELATED APPLICATIONS

This application makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN;"

U.S. application Ser. No. 10/183,704 in the name of Robert J. Friday, Patrice R. Calhoun, Robert B. O'Hara, Jr., Alexander H. Hills and Paul F. Dietrich, and entitled "Method and System for Dynamically Assigning Channels Across Multiple Radios in a Wireless LAN;"

U.S. application Ser. No. 10/302,508 in the name of Scott G. Kelly and Robert Tashjian, entitled "Network with Virtual 'Virtual Private Network' Server;"

U.S. patent application Ser. No. 10/407,584 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/407,370 in the name of Patrice R. Calhoun, Robert B. O'Hara, Jr. and David A. Frascone, entitled "Wireless Network System Including Integrated Rogue Access Point Detection;" and U.S. application Ser. No. 10/447,735 in the name of Robert B. O'Hara, Jr., Robert J. Friday, Patrice R. Calhoun, and Paul F. Dietrich and entitled "Wireless Network Infrastructure including Wireless Discovery and Communication Mechanism."

FIELD OF THE INVENTION

The present invention relates to wireless computer networks and, more particularly, to a wireless network security system that protects against access to internal network addresses.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, security of wireless network environments becomes a critical component to ensure the integrity of the enterprise's network environment against unauthorized access. Indeed, wireless networks pose security risks not typically encountered in wired computer networks, since any wireless client in the radio frequency (RF) coverage area of an access point can, without a physical connection, potentially gain access to the network, or at the very least capture data transmitted in wireless frames. In an 802.11 wireless network, prior art security mechanisms are implemented in a variety of manners. For example, the 802.11 protocol provides for shared-key authentication according to which a wireless client must possess a shared secret key in order to establish a wireless connection with an access point. In addition, as with wired networks, the wireless network infrastructure can operate in connection with application level security mechanisms, such as a RADIUS or other authentication server, to control access to network resources.

Various measures have been developed to protect against eavesdropping. For example, the Wired Equivalent Privacy (WEP) algorithm is used to protect wireless communications from eavesdropping by encrypting wireless traffic based on a shared private key. WEP seeks to establish similar protection to that offered by the wired network's physical security measures by encrypting data transmitted over the WLAN. Data encryption protects the vulnerable wireless link between clients and access points. Wi-Fi Protected Access (WPA) has also been developed to address the known security flaws associated with WEP.

In addition, VPN functionality offers another or additional method of securing wireless connections. A Virtual Private Network (VPN) is a known communication application that typically operates at Layer 3 and of the OSI Reference model. This mechanism is used to provide secure communication among clients that have established a connection to a VPN server, typically a physical element in such a network. Specifically, a VPN server provides both authentication of, and privacy for, communications between the VPN server and a user device, such as a wireless client device. A traditional application of a VPN server is to secure the communications between user devices that are outside an enterprise's facilities and the enterprise's network over the public internet or dial-up connections. A typical VPN server, after authenticating the communications from the user devices and removing any encryption applied to protect the privacy of those communications, forwards the communications onto the company's internal network, providing reasonable assurance of secure communications. When used to secure wireless networks, Virtual Private Networking (VPN) client software creates a secure connection between a mobile station and a VPN server. The VPN client residing on a mobile station encrypts all data passed between it and a VPN server, making it very difficult for data contained in intercepted wireless frames to be read.

Many VPN solutions, such as Layer 2 Tunneling Protocol (L2TP) and IPSec in tunnel mode, require the use of two client IP addresses, one for the "outer" encapsulating IP packet header and another for the encapsulated IP packet. In a typical deployment, a VPN client obtains an IP address from an ISP which is used for the "outer" IP address and a second IP address from the VPN Server (the "inner" IP address) which is the VPN client's IP address on the VPN protected network. When used to secure wireless communications between a mobile station and an access point that bridges wireless traffic, a mobile station is typically assigned an IP address using DHCP functionality. Conventionally, the inner and outer IP addresses for the client or mobile station are often identical in VPN deployments used to protect wireless networks. This has the undesirable effect of decreasing network security by exposing the inner IP addresses assigned to the mobile stations, as well as any network topology information that can be gleaned from the inner IP address or collection of IP addresses from other mobile stations.

In light of the foregoing, a need in the art exists for methods, apparatuses and systems that prevent eavesdroppers from obtaining access to internal network addresses assigned to mobile stations. Embodiments of the present invention substantially fulfill this need.

SUMMARY OF THE INVENTION

The present invention provides methods, apparatuses and systems directed to preventing unauthorized access to internal network addresses transmitted across wireless networks. According to the invention, mobile stations are assigned virtual client network addresses that are used as the outer network addresses in a Virtual Private Network (VPN) infrastructure, as well as unique internal network addresses used as the inner network addresses. In one implementation, the virtual client network addresses have little to no relation to the internal network addressing scheme implemented on the network domain. In one implementation, all clients or mobile stations are assigned the same virtual client network address. A translation layer, in one implementation, intermediates the VPN session between the mobile stations and a VPN server to translate the virtual client network addresses to the internal network addresses based on the medium access control (MAC) address corresponding to the mobile stations. In this manner, the encryption inherent in the VPN infrastructure prevents access to the internal network addresses assigned to the mobile stations.

DESCRIPTION OF THE DRAWINGS

FIG. 1 is a functional block diagram illustrating a wireless network system according to an implementation of the present invention.

FIG. 2 is a diagram illustrating the format encapsulation and de-encapsulation associated with a virtual private network system.

FIG. 3 is a flow chart diagram setting forth the overall process flow according to one implementation of the present invention.

FIG. 4 is a functional block diagram illustrating a wireless network system according to another implementation of the present invention.

FIGS. 7A 7B are flow chart diagrams providing methods, according to one implementation of the present invention, directed to intermediating VPN sessions between VPN clients and VPN servers.

DESCRIPTION OF PREFERRED EMBODIMENT(S)

A. Operating Environment

Figure 5:
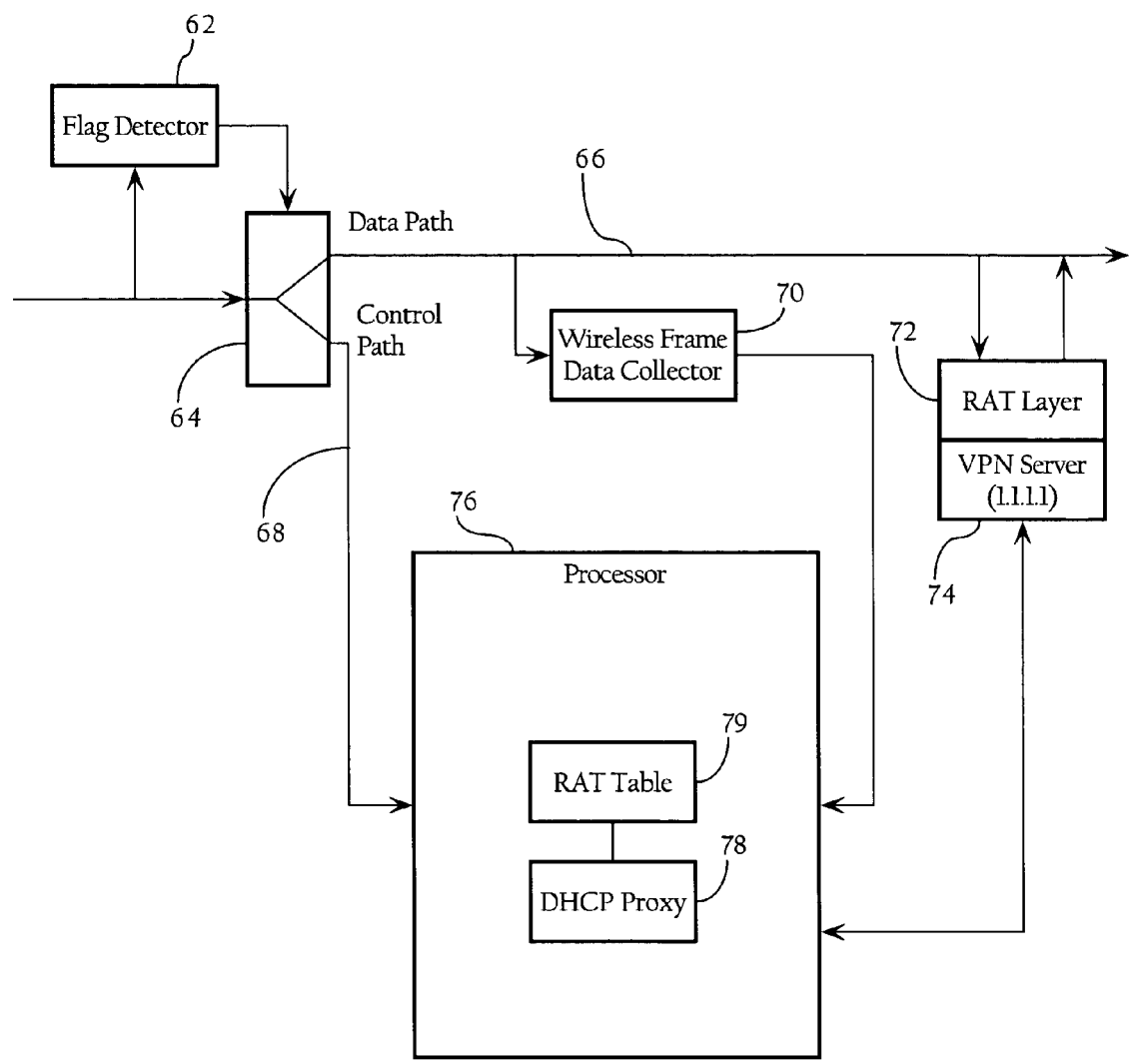
FIG. 5 is a functional block diagram setting forth the logical configuration, according to an implementation of the present invention, of a central control element.

For didactic purposes an embodiment of the present invention is described as operating in a WLAN environment as disclosed in U.S. application Ser. Nos. 10/155,938 and 10/407,357 incorporated by reference herein. As discussed below, however, the present invention can be implemented according to a vast array of embodiments, and can be applied to a variety of WLAN architectures.

FIG. 1 illustrates a wireless computer network environment according to an embodiment of the present invention. Referring to FIG. 1, there is shown a block diagram of a wireless Local Area Network system 10 according to an embodiment of the invention. A specific embodiment of the invention includes the following elements: access elements 12, 14 for wireless communication with selected client remote elements (or mobile stations) 16, 18, 20, 22, central control elements 24, 26, and means for communication between the access elements and the central control elements, such as direct line access 28, 30, but potentially a wireless backbone, fiber or other reliable link. As disclosed in U.S. patent application Ser. No. 10/407,357, in another embodiment, the access elements, such as access elements 11-15 are directly connected to LAN 10 or a virtual local area network (VLAN) for communication with a corresponding central control element 24, 26. See FIG. 4. As FIG. 1 illustrates, central control elements 24, 26 are connected to network 50 (e.g., a LAN, WAN, etc.), which may comprise one or more LAN segments. Router 52 routes packets to and from network 54, which may be a wide area or open computer network. In orie implementation, network 50 supports the Dynamic Host Configuration Protocol (DHCP), which provides a method for dynamically assigning IP addresses and configuration parameters to other IP hosts or clients in an IP network. In one implementation, central control elements 24, 26 may include DHCP server functionality in addition to, or in lieu of, network 50. Of course, other IP address assignment or configuration protocols, such as BootP, can also be used in connection with the present invention.

The access elements 11-15 are coupled via communication means using a wireless local area network (WLAN) protocol (e.g., IEEE 802.11a, 802.11b, 802.11g, etc.) to the client remote elements 16, 18, 20, 22. The communications means 28, between the access elements 12, 14 and the central control element 24 is typically an Ethernet network, but it could be anything else which is appropriate to the environment. As described in U.S. application Ser. No. 10/155,938, the access elements 12, 14 and the central control element 24 tunnel network traffic associated with corresponding remote client elements 16, 18; 20, 22 via direct access lines 28 and 30, respectively. Central control element 24 is also operative to bridge the network traffic between the remote client elements 16, 18; 20, 22 transmitted through the tunnel with corresponding access elements 12, 14.

As described in the above-identified patent applications, central control element 24 operates to perform data link layer management functions, such as authentication and association on behalf of access elements 12, 14. For example, the central control element 24 provides processing to dynamically configure a wireless Local Area Network of a system according to the invention while the access elements 12, 14 provide the acknowledgment of communications with the client remote elements 16, 18, 20, 22. The central control element 24 may for example process the wireless LAN management messages passed on from the client remote elements 16, 18; 20, 22 via the access elements 12, 14, such as authentication requests and authorization requests, whereas the access elements 12, 14 provide immediate acknowledgment of the communication of those messages without conventional processing thereof. Similarly, the central control element 24 may for example process physical layer information. Still further, the central control element 24 may for example process information collected at the access elements 12, 14 on channel characteristic, propagation, signal strength, and interference or noise. Central control element 26 and associated access elements 11, 13, 15 operate in a similar or identical manner. Other system architectures are possible. For example, U.S. application Ser. No. 10/407,357 discloses a system architecture where the access elements, such as access elements 12-15, are directly connected to segment of network 50. In addition, the present invention can operate in connection with conventional access points that do not include this hierarchical configuration.

FIG. 5 illustrates the logical configuration of central control elements 24, 26, according to an implementation of the present invention. In one implementation, central control elements 24, 26 comprise flag detector 62, logical switch 64, wireless frame data collector 70, processor 76, Reverse Address Translation (RAT) layer 72, and Virtual Private Network (VPN) server 74. As FIG. 5 illustrates, processor 76 includes DHCP proxy 78 operative to proxy DHCP transactions between DHCP clients and a DHCP server, as discussed more fully below. VPN server 74 is a mechanism that employs Layer 3 tunneling and encryption protocols to provide secure communications between remote client elements and other nodes accessible over LAN 50 and/or network 54. VPN server 74 may implement any support any suitable VPN protocol suite, such as IPSec, L2TP, etc. In one embodiment, VPN server 74 includes an authentication mechanism that controls access to the VPN functionality and, therefore, access to resources available through network 50. For example, VPN server 74 may verify a digital signature or other credential appended to a message transmitted by a remote client element. Other authentication mechanisms and protocols are possible. For example, VPN server 74 may transmit an explicit authentication challenge directing the user to enter a password or other response. RAT layer 72 is operative to translate virtual client network addresses to the internal network addresses corresponding to the remote client elements based on corresponding link layer (MAC) addresses, as discussed in more detail below.

As discussed in U.S. application Ser. No. 10/183,704, in one implementation, there is both a logical data path 66 and a control path 68 between a central control element 24 or 26 and an access element (e.g., access element 11). The control path 68 allows the central control element 24 or 26 to communicate with the radio access elements 11-15, as well as intercept and process various messages (e.g., DHCP requests and responses) sourced from or destined for the remote client elements. By monitoring the data path 66, the central control element 24 can, for example, intercept DHCP messages and transmit them to DHCP proxy 78 for processing. More specifically, a flag detector 62 identifies various packet or message types routing them through logical switch 64 to a high-speed data path 66 in communication with the wired network 50 or to control path 68 within the central control element 24 or 26. Identification of DHCP messages is based on analysis of one or more packet attributes against a signature that incorporates one or more elements of known DHCP message elements. One of ordinary skill in the art is able to configure flag detector 62 to recognize DHCP messages based on the DHCP specification described for example at RFC 2131, R. Droms, "Dynamic Host Configuration Protocol" (March 1997), which is incorporated by reference herein. As discussed in the above-identified applications, the data path 66 is optionally monitored by a wireless node data collector 70 to collect various information, such as signal strength data and the like. As FIG. 5 illustrates, the control path 68 is coupled to a processor element 76 including DHCP proxy 78. Processor 76 generally refers to hardware and software, such as a central processing unit, memory, a system bus, an operating system, device drivers, and one or more software modules implementing the functions performed by central control elements 24, 26. VPN server 74, in one implementation, may be implemented within the context of processor 76, or on a separate card or module.

In the network of FIGS. 1 and 4, the remote client elements 16, 18, 20, 22 each include DHCP client and VPN client functionality. In one implementation, the VPN clients implemented on remote client elements 16, 18, 20, 22 are configured with a virtual network address of VPN server 74, but resolve the virtual network address of the VPN server 74 to a globally unique ISO layer 2 address, as disclosed in U.S. application Ser. No. 10/302,508. In another implementation, however, the VPN server 74 incorporated into central control element 24 may include a unique IP address relative to the VPN server incorporated in other central control elements, such as central control element 26. As discussed in this patent application, the remote client elements may accomplish this address resolution by using any conventional network communication protocol that includes a feature specifically to effect address resolution. An example of one of these protocols is the Address Resolution Protocol (ARP), defined by the Internet Engineering Task Force (IETF) Request for Comments (RFC) 826, which is well known in the art. As discussed more fully below, the virtual client network address and the VPN server address are within the same subnet.

B. Reverse Address Translation and DHCP Intermediation

FIG. 3 illustrates the overall process flow, according to one implementation of the present invention, associated with integrated operation of the reverse address translation (RAT) functionality of the present invention with VPN server 74. As discussed more fully below, DHCP proxy 78 proxies DHCP transactions, and modifies associated DHCP messages, between DHCP clients and the DHCP server functionality supported by network 50 to obtain a dynamic IP address for internal purposes, yet providing a virtual outer network address to the remote client elements. As in conventional wireless network environments, a remote client element (mobile station) establishes a connection with a wireless network access point, such as access element 12 (102). In wireless networks implementing the 802.11 protocol, establishing a connection generally entails an authentication and an association phase. After the mobile station establishes a link layer connection with the wireless network, it initiates a DHCP transaction with a DHCP server which DHCP proxy intermediates, as discussed more fully below (103). As discussed below, the mobile station is configured with a virtual client network address as a result of the intermediated DHCP transaction. As discussed below, the mobile station uses the virtual client network address as the outer network address in VPN sessions with VPN server 74. Thereafter, RAT layer 72 intermediates the VPN session between the mobile station and VPN server 74, including the PPP or other authentication protocol, the IKE or other key exchange protocol, according to which the mobile station is configured with an internal network address as its inner network address.

Figure 6:
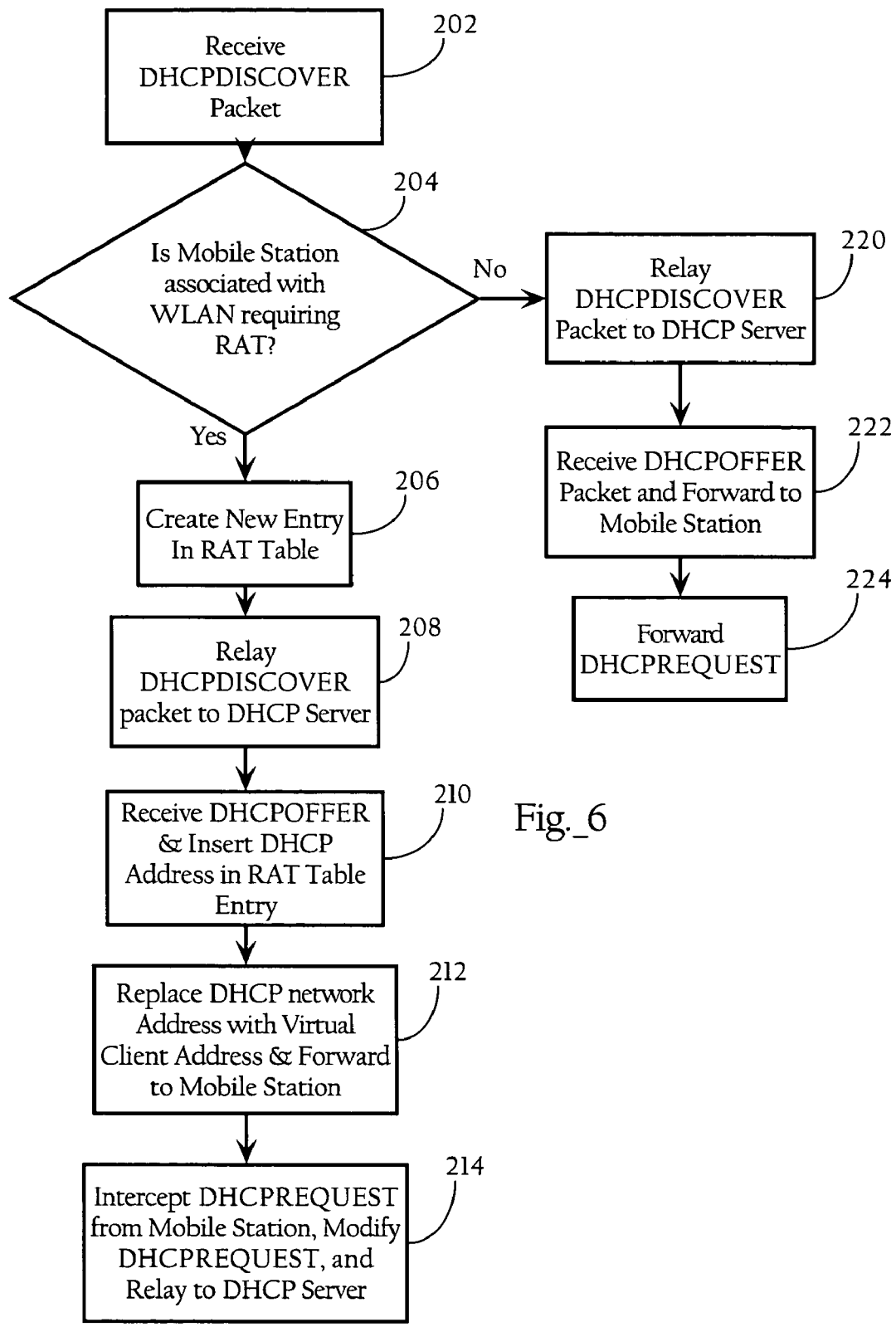
FIG. 6 is a flow chart diagram showing a method, according to one implementation of the present invention, directed to intermediating a DHCP transaction.

FIG. 6 sets forth a method, according to an implementation of the present invention, directed to intermediating DHCP transactions to obtain a DHCP address and provide a virtual client network address to mobile stations. As FIG. 6 provides, when DHCP proxy 78 receives/intercepts a DHCPDISCOVER packet (202), it determines whether the mobile station is associated with a wireless network that requires reverse address translation (RAT) (204). For example, the WLAN implemented at access element 12 may require VPN-implemented security (and hence reverse address translation), while the WLAN implemented at access element 14 may be an open wireless network. If the WLAN requires reverse address translation, DHCP proxy 78 creates a new entry in RAT Table 79 using the MAC address of the mobile station as the key (206). In one implementation, the RAT Table 79 includes the following fields: 1) client MAC address, 2) virtual client network address, and 3) internal (DHCP) network address. In one implementation, RAT Table 79 is implemented in a fixed-size memory space and overwrites the least-recently-used (LRU) entry when the RAT Table 79 is full. DHCP proxy 78, in one implementation, then relays the DHCPDISCOVER packet (in one implementation, as a DHCP relay packet) to a DHCP server (210). When DHCP proxy 78 receives a DHCPOFFER packet from the DHCP server (210), it inserts the internal DHCP network address in RAT Table 79 in association with the MAC address of the corresponding mobile station. DHCP proxy 78 then replaces the internal DHCP network address in the DHCPOFFER with a virtual client network address and forwards the DHCPOFFER packet to the mobile station (212). The DHCP client implemented by the mobile station transmits a DHCPREQUEST packet, which DHCP proxy 78 intercepts. In one implementation, DHCP proxy 78 intercepts the DHCPREQUEST, modifies the DHCPREQUEST to include the appropriate internal DHCP network address and relays the DHCPREQUEST to the DHCP server (or broadcasts the packet over the network, allowing the DHCP servers to release the non-selected network address(es)). As FIG. 6 provides, if the wireless network does not require reverse address translation (204), DHCP proxy 78 merely relays the DHCPDISCOVER packet to the DHCP server (220), and forwards the DHCPOFFER packet to the mobile station (222). As above, DHCP proxy 78 also forwards the DHCP request after it is received from the mobile station (224). DHCP proxy 78 also intermediates requests to renew/extend leased internal DHCP network addresses in a similar manner.

A variety of implementations are possible. For example, DHCP proxy 78 can be configured to transmit a DHCPREQUEST in response to a DHCPOFFER, and simply discard the DHCPREQUEST transmitted by the mobile station. Additionally, DHCP proxy 78 can be configured to broadcast the DHCP messages over network 50, instead of relaying the messages to an identified DHCP server. In such an implementation, DHCP proxy intercepts the DHCPOFFER packet(s), selects one of them (if necessary), replaces the dynamic IP address in the selected DHCPOFFER packet with the virtual outer IP address assigned to all clients and forwards the modified DHCPOFFER packet to the mobile station. Still further, central control elements 24, 26 may include DHCP server functionality obviating the need for the DHCP messages to be relayed or broadcast over network 50. Nevertheless, DHCP proxy 78 intermediates the DHCP transaction in such an implementation. Still further, the present invention can be used in connection with permanent leases of DHCP addresses. In addition, the DHCP server functionality may be modified to reserve IP addresses based on the MAC address of the mobile station.

After a remote client element receives a virtual client network address, in one implementation, it then initiates a VPN session with VPN server 74. RAT layer 72, in one implementation, intermediates the VPN session (including the Internet Key Exchange (IKE) protocol session) between the remote client elements and VPN server 74, using the information in RAT table 79 to replace the virtual client network address with the internal client network address as necessary.

FIG. 7A illustrates a method, according to one implementation of the present invention, for processing VPN packets received from remote client elements. As FIG. 7A shows, when a VPN packet from a remote client element is received (302), RAT layer 72, using the source MAC address 82 in the wireless frame, identifies the internal client IP address maintained in RAT table 79 (304). RAT layer 72 replaces the outer source network address 84 in the encapsulating VPN header (see FIG. 2) with the identified internal client network address (306), and passes the packet to the VPN server 74. VPN server 74 strips the encapsulating VPN header from the packet, decrypts the packet and transmits it to the destination host over network 50. FIG. 7B illustrates operation of RAT layer on packets transmitted to the remote client elements. When RAT layer 72 receives a VPN packet from VPN server 74 (322), it identifies the virtual client network address in RAT table 79 using the outer destination network address 83 (324). RAT layer 72 then replaces the outer destination network address in the original VPN packet with the virtual client network address identified in the RAT table 79 (326). The modified packet is then transmitted to the mobile station using the MAC address corresponding to the outer destination network address in the original VPN packet. One skilled in the art will appreciate that, due to the operation of RAT layer, the VPN clients implemented on the mobile stations are each configured with the internal network address originally generated by the DHCP server as the inner network address, while the outer IP address is the virtual client network address. One skilled in the art will also recognize that the operation of RAT layer 72 in connection with DHCP proxy 78 and VPN server 74 shields (through encryption) from eavesdropping the internal network address, as well as the internal network addressing scheme that may be revealed from the internal network address.

Of course other configurations are possible. For example, in another implementation, each mobile station may be statically configured with a virtual client network address. Initiation of a WLAN connection, causes the central control element to spoof the mobile station and obtain an internal network address from a DHCP server, for example, and insert it in RAT table 79 in association with the MAC address and virtual client network address of the mobile station. RAT layer 72 operates as discussed above to intermediate the VPN session between the mobile station and the VPN server 74.

C. Virtual Network Addresses

The virtual client network address and the virtual VPN server network address can be configured in a variety of ways. For example and in a preferred embodiment, the virtual client network address is 1.1.1.2, while the virtual VPN server network address is 1.1.1.1 with a /31 subnet mask. One skilled in the art will recognize that this network addressing scheme achieves the smallest possible subnet with two host addresses, a network address and a broadcast address. As discussed above, one host address is assigned, in one implementation, to all mobile stations as the virtual client network address, while the other host address is assigned to the VPN servers 74 associated with the central control elements 24, 26. In a preferred form, the virtual network addresses are within the smallest subnet possible to reduce the potential for address space collisions for legitimate network traffic. One skilled in the art will also recognize that the above addresses are non-routable (at present) network addresses. Other IP addresses can also be used, such as other addresses reserved by the Internet Address Number Authority (IANA) (e.g., 000/8, 002/8 and 010/8 networks, etc.). Of course, larger subnets for the virtual network addresses may also be used. For example, in one implementation, virtual network addresses may be configured on a per-domain basis, a per-WLAN basis. In addition, virtual network addresses may be assigned based on the time of association to a WLAN, or any other suitable criterion.

In one implementation, a network administrator may configure a virtual network address for VPN server 74 or for the mobile stations. In one implementation, central control element 24 includes functionality that computes the narrowest possible subnet and another unique IP address, given the IP address configured by the network administrator. For didactic purposes, assume that a 32-bit IP address consists of two pieces, a network address and a host address. Further, assume that each address consists of adjacent bits in the IP Address, and that the host address occupies the least significant (right most) bits of the IP address. For IP networks, a host address of all '1's is reserved for a broadcast address, and a host address of all '0's is reserved for a 'network' address. Accordingly, a host address must be at least two bits wide. A subnet mask consists of a 32 bit quantity with a '1' in every network address bit position and a '0' in every host address position.

In light of the foregoing, given an arbitrary IP address, <IP>, central control element 24 finds the largest subnet mask for the IP address containing <IP>, a second, discrete IP address, a broadcast address and network address. Because a host address that includes all 1's or 0's is not a valid host address, central control element 24 starts with the least significant bit (bit(0), by convention) and examine each bit sequentially for bit(n+1)≠bit(n), for n=0 to 30. The subnet mask consists of bits(31):bit(n+2), or (2exp(32)−1)−(2exp(n+2)−1). In other words, central control element 24 examines the binary representation of a given IP address and identifies the bit position of the first sequential bit pair that is neither all 1's or 0's. Once identified, the subnet mask is computed based on the identified bit position n. For example, if the last octet of a given IP address is <00001000>, n (the bit position) equals 2. Therefore, the subnet mask equals 0xffffffff−0x0000000f{2exp(n+2)−1}=0xfffffff0. In addition, to determine a unique second network address, central control element 24 XORs the given network address with the inverse of the computed subnet mask. Since XOR does not involve a carry operation it can be used on an arbitrary bit width value and does not need additional operations when the carry extends outside the host address.

The invention has been explained with reference to specific embodiments. For example, although the embodiments described above operate in connection with IEEE 802.11 networks, the present invention can be used in connection with any suitable wireless network protocol. Still further, although the embodiments described above operate in connection with a WLAN system including hierarchical processing of protocol information, the present invention can also be used in connection with a WLAN system comprising one or more substantially conventional access points that do not include this split or hierarchical configuration. Other embodiments will be evident to those of ordinary skill in the art. It is therefore not intended that the invention be limited except as indicated by the appended claims.

What is claimed is:

1. In a wireless network system comprising an access point providing wireless service to a mobile station and a Virtual Private Network (VPN) server operative to establish a VPN session with the mobile station, a method comprising
   intercepting an address assignment message from a network address configuration server to the mobile station, wherein the mobile station has a unique link layer address, wherein the network address configuration server is operative to provide internal network addresses to requesting mobile stations, and wherein the address assignment message contains an internal network address for the mobile station;
   associating, in a data structure, the unique link layer address of the mobile station with the internal network address provided by the network address configuration server in the address assignment message;
   replacing the internal network address in the address assignment message with a virtual network address; and
   forwarding the modified address assignment message to the mobile station;
   intermediating a VPN session between the VPN server and the mobile station; wherein the VPN session involves the exchange of encapsulated packets comprising an encapsulating VPN header including an outer network address corresponding to the mobile station, and wherein as to packets sourced from the mobile station, replacing the virtual network address used by the mobile station as the outer network address in the encapsulating VPN headers with the internal network address corresponding to the mobile station.

2. The method of claim 1 further comprising associating the unique link layer address of the mobile station with the internal network address provided by the network address configuration server.

3. The method of claim 1 further comprising
   as to packets sourced from the VPN server to the mobile station, replacing the internal network address corresponding to the mobile station in the encapsulating VPN headers of the packets with the virtual network address corresponding to the mobile station.

4. The method of claim 1 wherein the virtual network address is a non-routable address.

5. The method of claim 1 wherein the virtual network address is an Internet Protocol (IP) address.

6. The method of claim 5 wherein the virtual client network address is a first host address corresponding to a subnet consisting of a network address, a broadcast address, the first host address, and a second host address.

7. The method of claim 6 wherein the VPN server is configured with the second host address.

8. The method of claim 1 wherein the virtual network address is uniform for all mobile stations.

9. The method of claim 1 wherein the network address configuration server is a Dynamic Host Configuration Protocol (DHCP) server.

* * * * *